April 6, 1937. C. A. BAY 2,076,359
ELECTRICAL SERVICE CABLE GRIP
Filed June 1, 1936
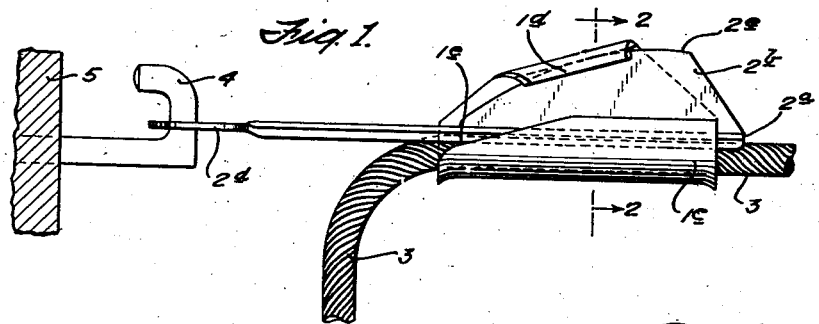
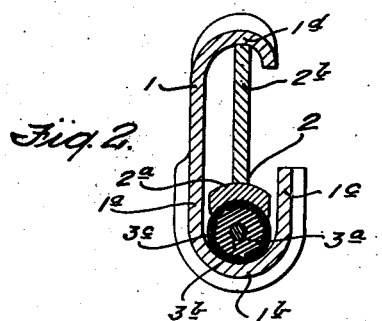
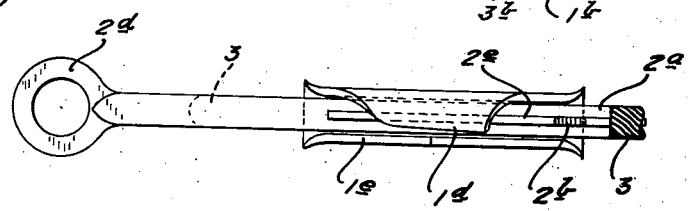
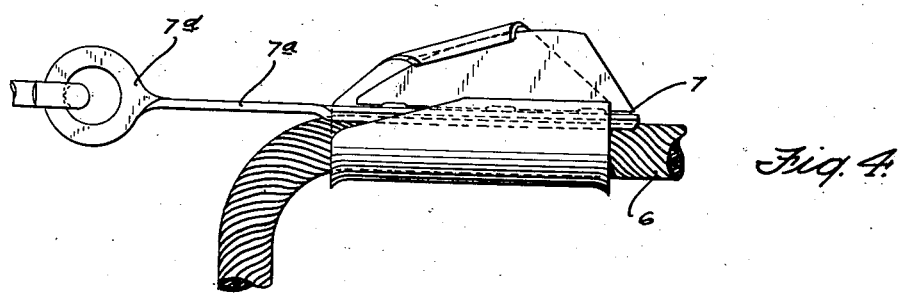
INVENTOR
CHARLES A. BAY
BY
*George T. Gill*
ATTORNEY Patented Apr. 6, 1937

2,076,359

UNITED STATES PATENT OFFICE 2,076,359

ELECTRICAL-SERVICE-CABLE GRIP

Charles A. Bay, Morristown, N. J., assignor to Metropolitan Device Corporation, a corporation of New York Application June 1, 1936, Serial No. 82,831

5 Claims. (Cl. 24—136)

The invention herein disclosed relates to a cable grip that is particularly suitable for securing electrical service cables of the concentric type to the wall of a building or other support.

The concentric cable when used as a service cable, that is, as a connecting cable between the line wires in the street and the meter in a building, commonly consist of one or more wires embedded in insulating material, and an outer wire formed of a plurality of strands wound in a continuous helix about the insulating material. This latter wire is exposed, being only partially embedded in the insulating material and forms a protective armor as well as the ground or neutral wire.

In installing such cables it has been found to be difficult to satisfactorily secure the cables to the side of buildings and other supports. The usual insulators are unsatisfactory because when the cable is wound about the insulator, the outer helical strands unravel and expose the cable and the strands are frequently injured, and it is an object of this invention to provide a cable grip by means of which such cables may be satisfactorily and adequately secured to the side of a building or other support.

In accordance with the invention there is provided a cable-receiving element that includes a channel-shaped section forming a cable-receiving channel and in which the cable is placed, and a section spaced from the cable-receiving channel and inclined to the axis thereof. Cooperating with this cable-receiving element there is a wedge element for clamping the cable in the cable-receiving channel of the cable-receiving element. The wedge element includes a section for engaging a cable in the cable-receiving channel and a blade extending from this cable-engaging section. The blade has an arcuate edge that cooperates with the inclined section of the cable-receiving element. The cable-engaging section of the wedge element is extended and adapted to be secured to a support and the arrangement is such that a force exerted on the cable is translated by the arcuate edge of the blade and the inclined section of the cable-receiving element into a clamping force.

Two such cable grips are illustrated in the accompanying drawing in which:

Fig. 1 is a side elevation of a cable grip embodying the invention and suitable for a two wire concentric cable;

Fig. 2 is a transverse section thereof taken on the line 2—2 of Figure 1;

Fig. 3 is a plan of the same; and

Fig. 4 is a plan of a grip suitable for a three wire concentric cable.

The cable grip illustrated in Figs. 1 to 3 of the drawing essentially comprises a cable-receiving element 1 and a wedge element 2. The cable-receiving element is a single piece of relatively thin metal and has one end curved to form a cable-receiving channel defined by a wall $1a$ formed by the major portion of the metal piece, a curved web $1b$ and a flange $1c$ parallel to the wall $1a$. The ends of this channel are flared as illustrated to protect the cable. The edges of the wall $1a$ converge and the edge opposite the cable-receiving channel is somewhat shorter than the cable-receiving channel and inclined to the axis thereof. This portion of the metal piece is curved to form an overhanging section $1d$ inclined to the axis of the cable-receiving section. A portion of the wall $1c$ is cut away at the corner forming an inclined edge $1e$ parallel to the inclined section $1d$. By so forming the edge of the wall $1c$ the cable-receiving element may be made substantially smaller than otherwise for this cut away portion provides a larger space between the edge of the inclined section $1d$ and the edge of the wall $1c$ between which the cable must pass to be inserted in the cable-receiving channel.

A cable such as the cable 3 which, briefly, consists of a central conductor $3a$ embedded in insulating material $3b$ and a helically wound, stranded wire $3c$ surrounding the insulation and but partially embedded therein, is passed between the edge of the wall $1c$ and the overhanging, inclined section $1d$ and into the cable-receiving channel. The cable is secured in the channel, and clamped therein to prevent it from slipping by the wedge element 2.

The wedge element 2 consists of a cable engaging section $2a$ that is formed from a strip of metal and shaped to have a surface substantially concentric with the cable. This surface engages the cable and it is slightly longer than the cable-receiving channel. From the opposite side of the cable-engaging section $2a$, there extends a wedge-shaped blade $2b$ having an arcuate edge $2c$ that engages the overhanging section $1d$ of the cable-receiving element. The arcuate edge of the blade thus converges with the section $2a$. The section $2a$ is extended and an eye $2d$ is formed on the end thereof.

After the cable is inserted in the cable-receiving channel the wedge element is inserted from the right end of the cable-receiving element as seen in Figure 1. The eye $2d$ of the wedge element is placed over a hook 4, previously inserted in the side of the building or other support 5. When the wedge element is thus fastened to the support, the cable is drawn up tight, the arcuate edge 2e of the wedge element cooperates with the inclined section 1d to wedge the cable in the cable-receiving channel and distributes the wedging force uniformly over the entire portion of the section 2a in contact with the cable. It will be seen that any force exerted on the cable only increases the force by which the cable is clamped in the cable-receiving channel and there is, therefore, no slippage of the cable.

In three wire concentric cables, such as the cable 6 shown in Figure 4 which are somewhat rectangular in cross section, the cable when stretched has a torsional force causing it to twist so that the major transverse axis of the cable becomes horizontal. Because of this the extension 7a of the wedge element 7 in grips for the three wire cables are twisted as indicated at 7b so that the eye 7c is at right angles to the plane of the extension 7a. In addition the channel for receiving the cable is deeper than the channel of the grip shown in Figures 1 to 3. Otherwise the two grips are the same.

From the above description of the two forms of cable grips illustrated in the drawing, it will be apparent to those skilled in the art that there is provided by this invention a cable grip that satisfactorily secures a cable to a support; that is inexpensive to manufacture; and that is easily manipulated.

It will be obvious that various changes may be made by those skilled in the art in the details of the embodiments illustrated in the drawing and described in detail above within the principle and scope of the invention as expressed in the appended claims.

I claim:

1. An electrical-service-cable grip of the type described comprising a cable-receiving element including a section forming a cable-receiving channel, and an overhanging section spaced from the cable-receiving channel and inclined to the axis thereof, and a wedge element for securing a cable in said cable-receiving channel of the cable-receiving element comprising a section for engaging a cable in the cable-receiving channel, a section extending from said cable-engaging section and having a longitudinally arcuate edge for engaging the inner surface of the inclined section of the cable-receiving element, and an extension for securing the wedge element to a support.

2. An electrical-service-cable grip of the type described comprising a cable-receiving element including a section forming a cable-receiving channel, and an overhanging section spaced from the cable-receiving channel and inclined to the axis thereof, and a wedge element for securing a cable in the cable-receiving channel of the cable-receiving element including a section for engaging a cable in the cable-receiving channel, a blade extending from said cable-engaging section and having a longitudinally arcuate edge for engaging the inner surface of said inclined section of the cable-receiving element, and an extension, extending longitudinally of said cable-engaging element for securing the wedge element to a support.

3. An electrical-service-cable grip of the type described comprising a cable-receiving element made from a single piece of metal and including a section forming a cable-receiving channel, and an overhanging section spaced from and of less length than the cable-receiving channel and inclined to the axis thereof, and a wedge element for securing a cable in the cable-receiving channel of the cable-receiving element including a section for engaging a cable in the cable-receiving channel, a blade extending from said cable-engaging section and having a longitudinally arcuate edge for engaging the inner surface of said inclined section of the cable-receiving element, and an extension, extending longitudinally of said cable-engaging element for securing the wedge element to a support.

4. An electrical-service-cable grip of the type described, comprising a cable-receiving element made from a single piece of metal and including a section constituting a cable-receiving channel, and an overhanging section spaced from said cable-receiving channel, the overhanging section being of less length than and inclined to the axis of said cable-receiving channel section and one corner of the wall of said channel receiving section being inclined substantially parallel to the edge of the overhanging section, and a wedge element for securing a cable in the cable-receiving channel of the cable-receiving element including a section for engaging a cable in said cable-receiving channel, a blade extending from said cable-engaging section and having a longitudinally arcuate edge for engaging the inner surface of said overhanging section of the cable-receiving element, and an extension, extending longitudinally of said cable-engaging element for securing the wedge element to a support.

5. An electrical-service-cable grip of the type described comprising a cable-receiving element made from a single piece of metal and including a curved edge forming a cable-receiving channel section, and a curved edge opposite to the cable-receiving channel section forming an overhanging section of less length than and inclined to the axis of the cable-receiving channel section, a portion of the wall of said cable-receiving channel being inclined substantially parallel to the edge of the overhanging inclined section, and a wedge element for securing a cable in said cable-receiving channel of the cable-receiving element including a section of slightly greater length than the cable-receiving channel for engaging a cable in the channel, and a wedge-shaped blade extending from the cable-engaging section and having a longitudinally arcuate edge for engaging the inclined section of the cable-receiving element, and an extension extending from the cable-engaging section for securing the wedge element to a support.

CHARLES A. BAY.